Inventors
Robert W. Bradley
Robert M. Osborn
By their Attorney
Thomas J. Ryan.

Aug. 19, 1952 R. W. BRADLEY ET AL 2,607,895

APPARATUS FOR KEYING AN OSCILLATOR

Filed April 16, 1948 2 SHEETS--SHEET 2

Inventors
Robert W. Bradley
Robert M. Osborn
By their Attorney
Thomas J. Hogan [signature]

Patented Aug. 19, 1952

2,607,895

UNITED STATES PATENT OFFICE 2,607,895

APPARATUS FOR KEYING AN OSCILLATOR

Robert W. Bradley, Marblehead, Mass., and Robert M. Osborn, Inglewood, Calif., assignors to United Shoe Machinery Corporation, Flemington, N. J., a corporation of New Jersey Application April 16, 1948, Serial No. 21,448

6 Claims. (Cl. 250—36)

This invention relates to high-frequency electronic oscillation generators and more particularly to a method of and means for keying self-biased electronic oscillators for on and off control of their output.

Almost all applications of such oscillators involve the need for on-off control of the output of the oscillator, frequently for the production of pulses of a predetermined duration. Various methods of controlling or keying an oscillator for such on-off operation have been proposed. One of such methods comprises keying the plate circuit of the oscillator so that the power supplying the oscillator tubes is effectively turned on and off. Because in this method a high voltage is developed across the switch contacts, careful attention must be given to proper insulation of the high voltage portions of the circuit. A similar insulation problem may arise, for example, in the filament transformer when the key is used in the cathode return. Where the oscillator is being used to supply considerable amounts of power as in industrial electronic heating, these problems are made manifold by the high voltages and currents which must be controlled. The switch used for keying the plate circuit must have a generous rating to handle such currents. Should it become defective, the operator may be exposed to the danger of electric shock.

Another oscillator keying method is to provide a biasing voltage to the control grids of the oscillator tubes sufficient to reduce the output of the oscillator to zero. The provision of such a biasing voltage, including the necessary attendant components, is a complication unwelcome in industrial applications.

Accordingly, it is an object of the present invention to provide an improved method of, and means for, the on-off control of an oscillator which does not require the handling of high potential currents nor the use of complicated apparatus.

Another object of the invention is the provision of apparatus for producing pulses of high-frequency power and which is controllable by simple means for keying currents of relatively low voltage and magnitude.

Yet another object of the invention is the provision of apparatus for producing pulses of high-frequency power of a variable predetermined duration.

As illustrated, these objects are accomplished by keying the direct-current grid circuit of a self-biased oscillator.

A further object of the invention is the provision of an arrangement for producing pulses of high-frequency power of predetermined duration comprising an oscillator controlled in accordance with the method of the invention by a multi-vibrator-type circuit.

Figure 1:
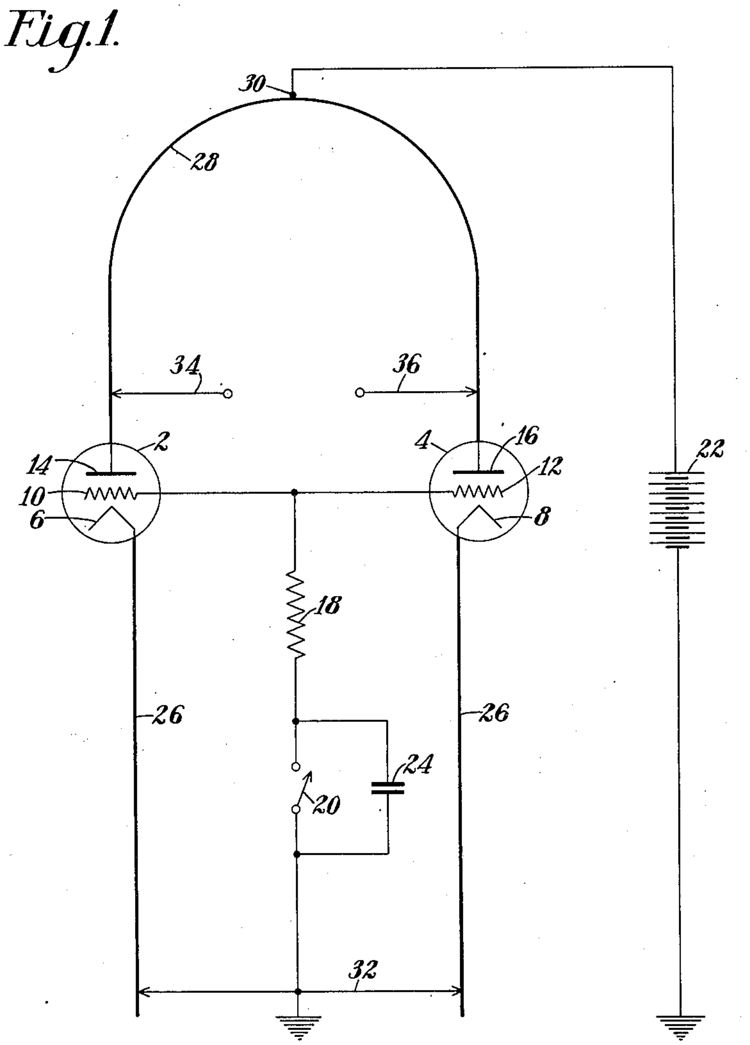
Figure 2:
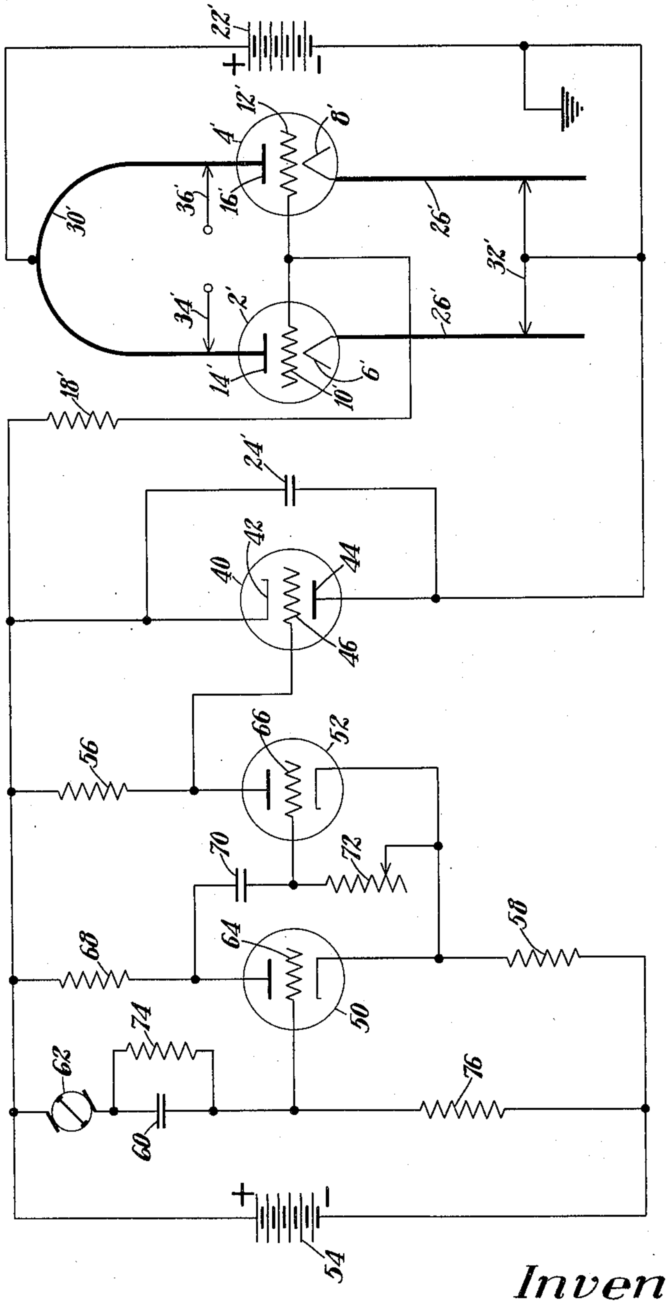

Other features and advantages of the invention may best be understood by reference to the drawing in which Fig. 1 is a diagram of a push-pull self-biased tuned-plate tuned-filament oscillator illustrating the application of the method of the invention; and Fig. 2 is a diagram of a modified circuit for controlling such an oscillator by the method of the invention for producing pulses of high-frequency power of variable predetermined duration.

Keying of the grid circuit of an oscillator has not heretofore been considered a feasible method of controlling the oscillator. It has been believed that if the grid circuit of an oscillator were to be opened while the plate voltage was being applied, there would be no absolute control of the grid bias and hence such bias would be uncertain and might even become positive so as to permit a destructive rush of plate current.

We have found, however, that if only the direct-current grid circuit of a self-biased oscillator is keyed while high-frequency channels providing the oscillatory exciting voltage between the grid and cathode are preserved, grid keying may satisfactorily be used to control the oscillator. Under these conditions, since the oscillator can still oscillate whenever any plate current flows, even though the direct-current grid circuit is opened by the opening of the key, grid current will flow through the high resistance of the leakage path around the key to provide a cut-off bias on the grid practically instantly.

The oscillator illustrated provides a convenient and efficient source of high-frequency electric power. The invention, however, is applicable to any self-biased oscillator so long as provision is made for preserving the integrity of the high-frequency exciting circuit when the grid key is open. In certain types of oscillators this may require the insertion of a by-pass condenser as will readily be understood by those skilled in the art.

Referring to Fig. 1, the illustrated oscillator comprises two triode tubes 2, 4 having filaments 6, 8 heated from a source of current not shown, grids 10, 12 and plates 14, 16.

The grids are connected together and to a grid-leak resistor 18. The other end of the resistor is connected to ground through a key comprising switch 20. The plates are connected to the ends of an inductance loop 28 having a center tap 30 for connection to the plate power supply represented by a battery 22. The filaments are shown connected to a resonant filament line 26 which is tunable by a slider 32, the center point of which is connected to ground. In accordance with the invention, switch 20 is in the direct-current grid circuit but not in the high-frequency exciting circuit inasmuch as the balanced grids operate independently of any direct ground connection while the filaments being connected to opposite ends of the filament line 26 see-saw at high-frequency, being excited through inter-electrode capacitances. Hence the channels providing the oscillatory grid-cathode exciting voltage are not interrupted by opening switch 20.

A condenser 24 is shown connected across the switch 20 for by-passing any high-frequency currents. This condenser is not necessary for the operation of the control in the push-pull oscillator shown but may be advantageous if the switch is remotely located. In operation, with the switch 20 open, the grid to filament circuit of the oscillator has, in effect, a very high resistance, amounting to the leakage resistance. When now the two tubes tend to conduct plate current and to oscillate, the flow of grid current as oscillation begins builds up a negative voltage on the grids, equivalent to a negative charge on the grid to filament capacitance of the tubes and circuit, quickly driving the grids of the oscillator tubes below cut-off and killing the oscillation.

The charge may drain off slowly through leakage paths but will immediately be restored when oscillation commences; if oscillation occurs, it will occur in very short pulses of the order of a microsecond at comparatively very long intervals which may be 1 to 10 or more seconds. The average plate current and the average high-frequency power are very nearly zero.

Upon closing the switch, the grid to filament direct-current circuit of the oscillator tubes is completed through the grid resistor 18 and the oscillator generates high-frequency power, for example, to the output leads 34 and 36, in a normal manner as long as the contacts remain closed. The oscillator may, therefore, be keyed by the simple closing and opening of the switch.

For many purposes, it is advantageous to utilize high-frequency electric power in pulses which are of a predetermined duration and to supply each pulse in response to a trigger signal, for example, from a switch actuated by some part of a working mechanism. Where this signal is derived from mechanism motion it will be recognized that the length of the signal will vary with variations in the speed of such motion so that means must be provided to make the pulse length independent of the signal length.

Fig. 2 illustrates a diagram of apparatus for supplying responsively to a trigger signal high-frequency pulses of a predetermined length independent of signal length. In this diagram, the oscillator components largely correspond with those shown in Fig. 1 as indicated by prime reference numerals. However, the switch 20 of Fig. 1 is replaced by a grid-controlled space-discharge switching tube 40 having its cathode 42 connected to the grid-bias resistor 18' and its anode 44 connected to the filaments of the oscillator through the slider 32'.

The conductivity of switching tube 40 is controlled by the bias voltage applied to its grid 46 from the output of a one-shot multivibrator circuit comprising the triodes 50, 52 each disposed in one stage of a well-known modification of the Eccles-Jordan circuit so that tube 50 is normally cut off, with its grid 64 connected to a source of negative bias through resistor 76, and tube 52 is normally conducting. In this condition, plate current flows through tube 52 from a source of direct current 54, through the plate resistor 56, the tube, and the cathode resistor 58. The ends of the resistor 56 are connected respectively to the grid and cathode of tube 40. When plate current flows through this resistor, the voltage drop produced thereby is accordingly applied to the tube 40 as a negative bias voltage tending to cut off tube 40. When tube 40 is cut off, the oscillator grid current cannot flow through the tube and the oscillator is shut off by self-bias as previously described in connection with Fig. 1 when switch 20 was opened.

In operation, trigger signals in the form of positive pulses are impressed on the grid 64 of tube 50 through condenser 60, for example, by means of a switch or commutator 62 intermittently connecting the condenser to the positive pole of the power supply as shown. In practice, the commutator would be power-driven as from a drive shaft, to get repeated pulses.

Each signal causes tube 50 to become conductive and to initiate the cut-off of tube 52 by the voltage drop in resistor 68 coupled to grid 66 through condenser 70. Conduction thereupon switches abruptly from tube 52 to tube 50 and the circuit remains in this condition until the discharge of condenser 70 through the variable resistor 72 initiates an abrupt return of the circuit to its original balanced condition with tube 52 conducting.

During the time tube 52 is cut off, no current passes through resistor 56 and hence tube 40 has a zero grid bias permitting the passage of oscillator grid current and the production of a pulse of high-frequency power to the output leads 34' and 36'.

The length of the multivibrator cycle and hence the length of the pulse is controlled by the time constant of condenser 70 and variable resistor 72 and hence may be varied by manipulating resistor 72.

Resistor 74 is employed to permit any charge on condenser 60 to leak off between pulses. It is to be understood that the cathodes of all tubes are heated directly or indirectly from a source not shown.

Having thus described our invention, what we claim as new and desire to secure by Letters Patent of the United States is:

1. Apparatus for providng high-frequency electric energy, the output of which may be keyed by simple means at relatively low voltage comprising a self-biased high-frequency oscillator having a control grid-cathode direct-current circuit including a resistor for providing such self-bias, said circuit also including keying means for interrupting the grid-cathode direct-current circuit, said oscillator also having an exciting circuit coupled therein to provide oscillatory control-grid-cathode exciting voltage without providing a path for direct grid current during the time said direct-current circuit is interrupted, said resistor and keying means being external of the exciting circuit.

2. Apparatus for the provision of pulses of high-frequency electric energy comprising a push-pull, tuned-filament, tuned-plate, self-biased oscillator having two triodes, the grids of which are connected together, and a resonant tank circuit to opposite sides of which the filaments of the triodes are respectively connected, said grids also being connected to the filament circuit through a grid leak resistor and a switch.

3. Apparatus for producing pulses of high-frequency electric energy comprising, in combination, a self-biased high-frequency oscillator having a high-frequency oscillatory circuit coupled therein for providing oscillatory control-grid-cathode exciting voltage without providing a direct-current grid-cathode path and having a direct-current control-grid-cathode circuit, a grid-controlled vacuum switching tube series-connected in said circuit at a location external of said high-frequency circuit so that interruption of the oscillator grid current flow by said tube does not interrupt the high-frequency feedback, said tube comprising at least a grid, cathode and anode, means for normally maintaining a cut-off bias voltage on the grid of said tube to block the passage of oscillator grid current, means responsive to a trigger signal for reducing said voltage to permit the passage of such grid current, and means for automatically restoring the said voltage to its blocking value after the lapse of a predetermined period of time.

4. Apparatus for providing pulses of high-frequency electric energy comprising, in combination, a self-biased high-frequency oscillator having a high-frequency oscillatory circuit coupled therein for providing oscillatory control-grid-cathode exciting voltage without providing a direct-current grid-cathode path and having a direct-current control-grid-cathode circuit, a grid-controlled vacuum switching tube and a biasing resistor series-connected in said circuit at a location external of said high-frequency circuit, and a one-shot multivibrator connected to said tube to normally maintain a cut-off bias voltage on its grid, and, responsively to a trigger signal initiating the multivibrator cycle, to reduce said voltage to permit the passage of oscillator grid current for the duration of said cycle.

5. Apparatus as in claim 4 in which the normal cut-off bias voltage is provided by the voltage drop across a resistor produced by the plate current flow in the normally conducting stage of the one-shot multivibrator.

6. In apparatus of the class described, an oscillator tube having anode, cathode, and control-grid electrodes, an oscillation circuit coupled to said cathode and control-grid electrodes to provide exciting voltage without providing a direct current path from the control grid to the cathode, and a direct current circuit connecting the said grid to the cathode, said circuit including a portion external of said oscillation circuit, said portion comprising a switch and a bias resistor serially connected.

ROBERT W. BRADLEY.
ROBERT M. OSBORN.

REFERENCES CITED

The following references are of record in the file of this patent:

UNITED STATES PATENTS

| Number | Name | Date |
|---|---|---|
| 1,923,345 | Wallace | Aug. 22, 1933 |
| 2,253,849 | Dow | Aug. 26, 1941 |
| 2,409,577 | Matson | Oct. 15, 1946 |